US012707311B2

(12) United States Patent
Karjalainen et al.

(10) Patent No.: US 12,707,311 B2
(45) Date of Patent: Aug. 11, 2026

(54) BEAM GROUP REPORTING FOR MULTI-TRP OPERATION

(71) Applicant: Nokia Technologies Oy, Espoo (FI)

(72) Inventors: Juha Pekka Karjalainen, Oulu (FI); Sami-Jukka Hakola, Oulu (FI); Frederick Vook, Naperville, IL (US); Mihai Enescu, Espoo (FI); Timo Koskela, Oulu (FI); Youngsoo Yuk, Seoul (KR)

(73) Assignee: Nokia Technologies Oy, Espoo (FI)

( * ) Notice: Subject to any disclaimer, the term of this patent is extended or adjusted under 35 U.S.C. 154(b) by 166 days.

(21) Appl. No.: 18/549,628

(22) PCT Filed: Mar. 23, 2022

(86) PCT No.: PCT/EP2022/057562

§ 371 (c)(1),
(2) Date: Sep. 8, 2023

(87) PCT Pub. No.: WO2022/214311

PCT Pub. Date: Oct. 13, 2022

(65) Prior Publication Data

US 2024/0187077 A1 Jun. 6, 2024

Related U.S. Application Data

(60) Provisional application No. 63/170,659, filed on Apr. 5, 2021.

(51) Int. Cl.

| | |
|---|---|
| ***H04B 7/06*** | (2006.01) |
| ***H04B 7/08*** | (2006.01) |
| ***H04W 24/10*** | (2009.01) |

(52) U.S. Cl.

CPC ........ *H04W 24/10* (2013.01); *H04B 7/06952* (2023.05); *H04B 7/0822* (2013.01); *H04B 7/088* (2013.01)

(58) Field of Classification Search

CPC . H04B 7/06; H04B 7/08; H04B 7/088; H04B 7/0456; H04B 7/0822;

(Continued)

(56) References Cited

U.S. PATENT DOCUMENTS

| | | | |
|---|---|---|---|
| 2018/0323845 A1 | 11/2018 | Chang et al. |
| 2019/0260452 A1 | 8/2019 | Zhang et al. |

(Continued)

FOREIGN PATENT DOCUMENTS

| | | |
|---|---|---|
| CN | 112075029 A | 12/2020 |
| EP | 3512150 A1 | 7/2019 |

(Continued)

OTHER PUBLICATIONS

Office action received for corresponding Japanese Patent Application No. 2023-561281, dated Aug. 29, 2024, 4 pages of office action and 6 pages of translation available.

(Continued)

*Primary Examiner* — Shawkat M Ali

(74) *Attorney, Agent, or Firm* — Brake Hughes Bellermann LLP

(57) ABSTRACT

Methods and apparatus, including computer program products, are provided for beam group reporting. In some example embodiments, there may be provided a method that includes receiving, at the user equipment, configuration information to configure the user equipment to report information for beam grouping on measurements on at least one group of channel measurement resources; selecting, by the user equipment, at least one group from a plurality of groups of channel measurement resources, the selecting based on at least one rule provided by the configuration information; and reporting, to a network, information regarding the selected at least one group for the beam grouping. Related systems, methods, and articles of manufacture are also disclosed.

18 Claims, 12 Drawing Sheets

Receive configuration information that configures the user equipment to report information for beam grouping on measurements on at least one group of channel measurement resources 910

Select, based on at least one rule provided by the configuration information 915

Report, to the network, information regarding the selected at least one group for the beam grouping 920

(58) Field of Classification Search

CPC H04B 7/06952; H04B 17/318; H04B 17/336; H04L 5/00; H04L 5/14; H04L 25/02; H04W 16/28; H04W 24/08; H04W 24/10; H04W 56/00; H04W 72/541; H04W 76/20

USPC ......... 370/328–330; 375/219, 260, 262, 267, 375/295, 316

See application file for complete search history.

(56) References Cited

U.S. PATENT DOCUMENTS

| | | | | |
|---|---|---|---|---|
| 2020/0059290 | A1 | 2/2020 | Pan et al. | |
| 2020/0274597 | A1* | 8/2020 | Chen .................... | H04B 7/0626 |
| 2021/0211176 | A1* | 7/2021 | Gao ..................... | H04B 17/318 |

FOREIGN PATENT DOCUMENTS

| | | | |
|---|---|---|---|
| JP | 2020-530241 | A | 10/2020 |
| WO | 2020/027547 | A1 | 2/2020 |
| WO | 2020034312 | A1 | 2/2020 |
| WO | 2020204324 | A1 | 10/2020 |
| WO | 2020/255313 | A1 | 12/2020 |

OTHER PUBLICATIONS

“Enhancements on Beam Management for Multi-TRP/Panel Transmission”, 3GPP TSG RAN WG1 #104-e Meeting, R1-2101008, Agenda item: 8.1.2.3, Nokia, Jan. 25-Feb. 5, 2021, 13 pages.

“Enhancements on beam management for multi-TRP”, 3GPP TSG RAN WG1 #104-e, R1-2100621, Agenda item: 8.1.2.3, LG Electronics, Jan. 25-Feb. 5, 2021, pp. 1-9.

“Enhancement on beam management for multi-TRP”, 3GPP Tsg Ran WG1 #104-e, R1-2100589, Agenda item: 8.1.2.3, MediaTek Inc., Jan. 25 - Feb. 5, 2021, 9 pages.

Office action received for corresponding Indian Patent Application No. 202347066290, dated Oct. 29, 2024, 7 pages.

“3rd Generation Partnership Project; Technical Specification Group Radio Access Network; NR; Physical channels and modulation (Release 16)”, 3GPP TS 38.211, V16.4.0, Dec. 2020, pp. 1-133.

“3rd Generation Partnership Project; Technical Specification Group Radio Access Network; NR; Multiplexing and channel coding (Release 16)”, 3GPP TS 38.212, V16.4.0, Dec. 2020, pp. 1-152.

“3rd Generation Partnership Project; Technical Specification Group Radio Access Network; NR; Physical layer procedures for control (Release 16)”, 3GPP TS 38.213, V16.4.0, Dec. 2020, pp. 1-181.

“3rd Generation Partnership Project; Technical Specification Group Radio Access Network; NR; Physical layer procedures for data (Release 16)”, 3GPP TS 38.214, V16.4.0, Dec. 2020, pp. 1-169.

“3rd Generation Partnership Project; Technical Specification Group Radio Access Network; NR; Radio Resource Control (RRC) protocol specification (Release 16)”, 3GPP TS 38.331, V16.3.1, Jan. 2021, pp. 1-932.

Li et al., “Beam Management in Millimeter-Wave Communications for 5G and Beyond”, IEEE Access, vol. 8, Jan. 1, 2020, pp. 13282-13293.

“IEEE 802.11”, Wikipedia, Retreived on Sep. 21, 2023, Webpage available at : https://en.wikipedia.org/wiki/IEEE_802.11.

“IEEE 802.16”, Wikipedia, Retreived on Sep. 21, 2023, Webpage available at : https://en.wikipedia.org/wiki/IEEE_802.16.

“IEEE 802.3”, Wikipedia, Retreived on Sep. 21, 2023, Webpage available at : https://en.wikipedia.org/wiki/IEEE_802.3.

“IEEE 802.15 ”, Wikipedia, Retreived on Sep. 21, 2023, Webpage available at : https://en.wikipedia.org/wiki/IEEE_802.15.

International Search Report and Written Opinion received for corresponding Patent Cooperation Treaty Application No. PCT/EP2022/057562, dated Jul. 8, 2022, 13 pages.

Office Action for Korean Patent Application No. 10-2023-7037685, mailed on Aug. 25, 2025, 6 pages.

3GPP Tsg Ran WG1 #104-e; R1-2100621;“Enhancements on Beam Management for Multi-TRP”; Agenda item: 8.1.2.3; Source: LG Electronics; e-Meeting; ;anuary 25-Feb. 5, 2021, 9 pages.

3GPP TSG RAN WG1 #104-e Meeting; R1-2101008; “Enhancements on Beam Management for Multi-TRP/Panel Transmission”; Agenda item: 8.1.2.3; Source: Nokia, Nokia Shanghai Bell; e-Meeting; Jan. 25-Feb. 5, 2021; 12 pages.

Office Action for Chinese Application No. 202280026450.0, mailed on Jun. 16, 2026, 18 pages.

* cited by examiner

FIG. 4
CSI-RE w/ repetition (P3)
SSB
410
412
SSB
P-TRS
CSI-RS w/ repetition (P3)
P-TRS
A-TRS
P-TRS
CSI-RS w/o repetition (P1, P2, CSI aquisition)
SSB

BEAM GROUP REPORTING FOR MULTI-TRP OPERATION

FIELD

The subject matter described herein relates to wireless communications.

BACKGROUND

In 5G's New Radio (NR), the system may operate with beam based operation at above the 6 GHz carrier frequency range as well as below 6 GHz. When this is the case, the transmitter and the receiver may operate using spatial domain beamforming (e.g., in the analog domain, in the digital domain, or a combination of both) to cover the propagation loss associated with the radio channel. Moreover, the user equipment may include multiple receive antenna panels, in which each antenna panel includes an antenna elements and/or beamforming module. Depending on the user equipment's reception capability, a set of antenna panels (at the user equipment) may be used for simultaneously reception of a downlink from the network, such as a gNB base station or other type of cellular base station.

SUMMARY

In some example embodiments, there may be provided a method that includes receiving, at the user equipment, configuration information to configure the user equipment to report information for beam grouping on measurements on at least one group of channel measurement resources; selecting, by the user equipment, at least one group from a plurality of groups of channel measurement resources, the selecting based on at least one rule provided by the configuration information; and reporting, to a network, information regarding the selected at least one group for the beam grouping.

In some variations, one or more of the features disclosed herein including the following features can optionally be included in any feasible combination. The at least one rule includes ranking the plurality of groups of channel measurement resources in order to determine which of the plurality of group of simultaneously received channel measurement resources to select as the at least one group. The ranking is based at least in part on one or more of the following: an absolute beam group difference values of the channel measurement resources, an aggregated mutual information of the channel measurement resources, a number of needed receive antenna panel switches being minimized to be less or equal to a threshold maximum number of antenna panel switches or less than or equal to a threshold latency constraint value, or a combination thereof. The at least rule includes determining, for the plurality of groups of channel measurement resources, whether a beam group difference value is within a threshold dynamic range value. The at least rule including determining, for the plurality of groups of simultaneously received channel measurement resources, whether signal-to-interference-plus-noise values for each of the plurality of groups of channel measurement resources are above a signal-to-interference-plus-noise threshold value. The information for the beam grouping includes assistance information for the network. The reporting is triggered by a request from the network. The reporting is triggered by the user equipment based on one or more conditions. The one or more conditions are provided to the user equipment by the network and/or are preconfigured at the user equipment. The configuration information includes one or more of the following: information regarding a measurement window for the plurality of groups channel measurement resources, an identification of the channel measurement resources, the one or more conditions, and the at least one rule. The one or more conditions include one or more of the following: a largest absolute beam group difference value associated with the measurement window, a quantity of simultaneously received channel measurement resources for a group of the channel measurement resources, and a largest interference power including an interference resource identifier. The one or more conditions include a first condition, wherein the first condition includes a measured linear average SINR or a measured linear average RSRP being smaller than a preconfigured SINR threshold value or RSRP threshold value, wherein in response to the first condition being satisfied, the reporting for the selected at least one group includes a transmit power boost for the CMRs. The one or more conditions include a second condition, wherein the second condition incudes a measured linear average value of an absolute beam group difference, which is between a maximum and a minimum of SINR or RSRP, being larger than a preconfigured maximum allowable dynamic range, wherein in response to the second condition being satisfied, the reporting for the selected at least one group includes a quantized dynamic range increase value. The one or more conditions include a third condition, the third condition includes a measured linear average power value of interference measurement resource associated with the measurement window being larger than a preconfigured interference power threshold, wherein in response to the third condition being satisfied, the reporting for the selected at least one group includes at least one resource index.

In some example embodiments, there may be provided a method that includes sending, to the user equipment, configuration information to configure the user equipment to report information for beam grouping on measurements on at least one group of channel measurement resources, wherein the configuration information provides at least one rule to enable the user equipment to select the at least one group of channel measurement resources; and receiving, from the equipment, information regarding the at least one group selected, by the user equipment, based on the configuration information including the at least one rule.

The above-noted aspects and features may be implemented in systems, apparatus, methods, and/or articles depending on the desired configuration. The details of one or more variations of the subject matter described herein are set forth in the accompanying drawings and the description below. Features and advantages of the subject matter described herein will be apparent from the description and drawings, and from the claims.

Figure 1:
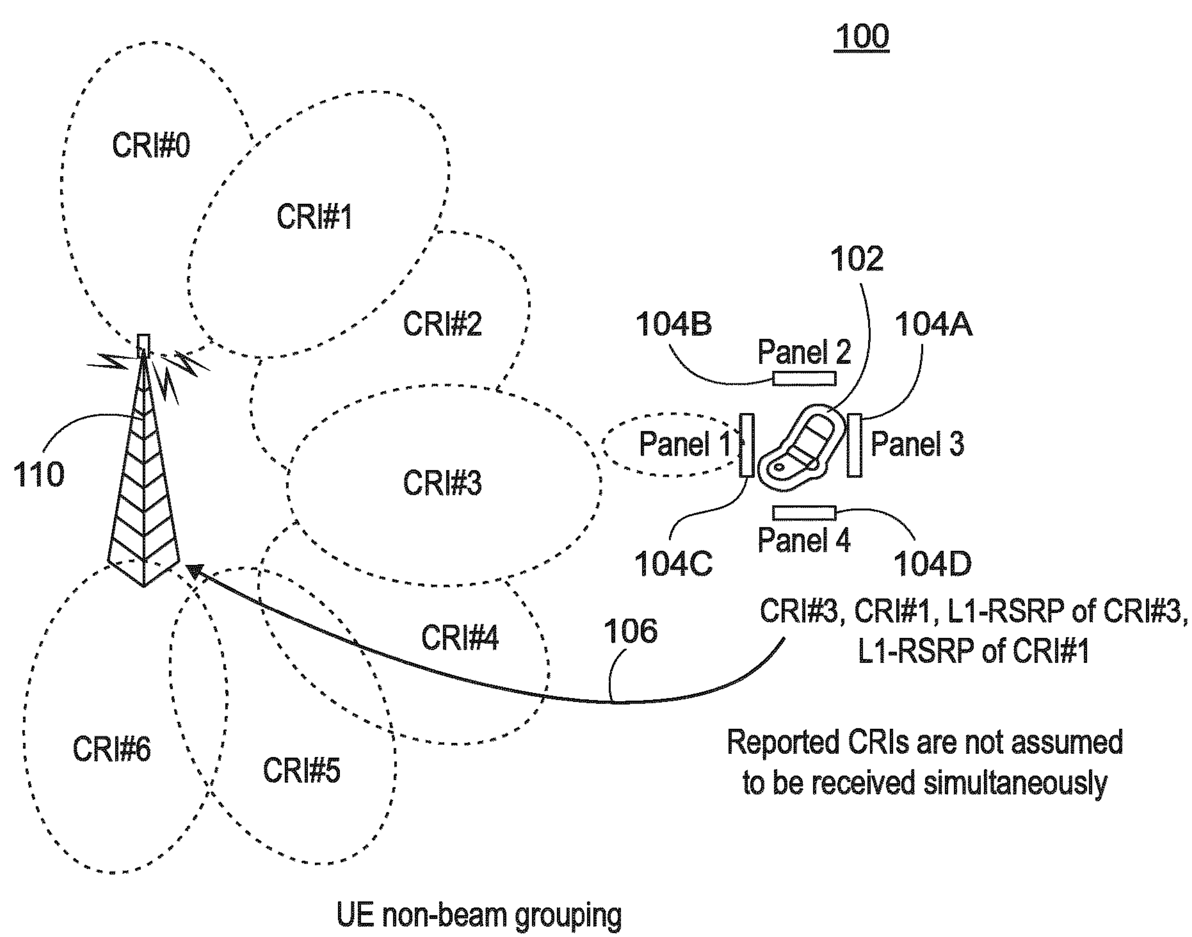
FIG. 1 depicts an example of a system including a base station and at least one user equipment including 4 antenna panels, in accordance with some example embodiments.

Like labels are used to refer to same or similar items in the drawings.

DETAILED DESCRIPTION

To enable downlink (DL) channel state information (CSI) measurements for beam management (BM), support may be provided for two different CSI resources settings, non-zero power-channel state information-reference symbol (NZP-CSI-RS) and Synchronization Signal Block (SSB) (see, e.g., 3GPP TS 38.214). The time domain behavior of the CSI-RS (channel state information-reference signal) resources for beam management may be configured by higher layer signaling to be aperiodic, periodic, or semi-persistent. The supported NZP-CSI-RS resource element pattern and antenna port configurations for beam management may be defined as well (see, e.g., 3GPP TS 38.214). In 5G's New Radio Release-15 (as well as other subsequent releases), there may also be support for the user equipment reporting in a group-based beam reporting scheme and a non-group based scheme (see, e.g., TS 38.214, section 5.2.1.4.2).

FIG. 1 depicts an example of a system 100 including a base station 110, such as gNB base station, and at least one user equipment 102 including 4 antenna panels 104A-D. In the example of FIG. 1, there is depicted an example of non-beam group-based reporting at 106 with NZP-CSI-RS resources. The network, such as the base station 110, may configure channel state information (CSI) reporting with four CSI-RS Resource Indicators (CRIs) with the layer 1 reference symbol received power (L1-RSRP) values to be reported. For the sake of simplicity of explanation, only two CRIs are shown. When the network configures beam reporting to be non-group-based reporting, the UE is not assumed to receive simultaneously reported CRIs associated with L1-RSRP or L1-SINR (layer 1 signal-to-interference-plus-noise-ratio) values. When the downlink transmit beam switch occurs among reported CRIs, additional time may be needed to be reserved to enable the UE to change its receive (RX) beam and/or receive antenna panel. As a result of additional time need for the change, the scheduling flexibility of the network may be limited, and the beam group-based reporting may be used.

Figure 2:
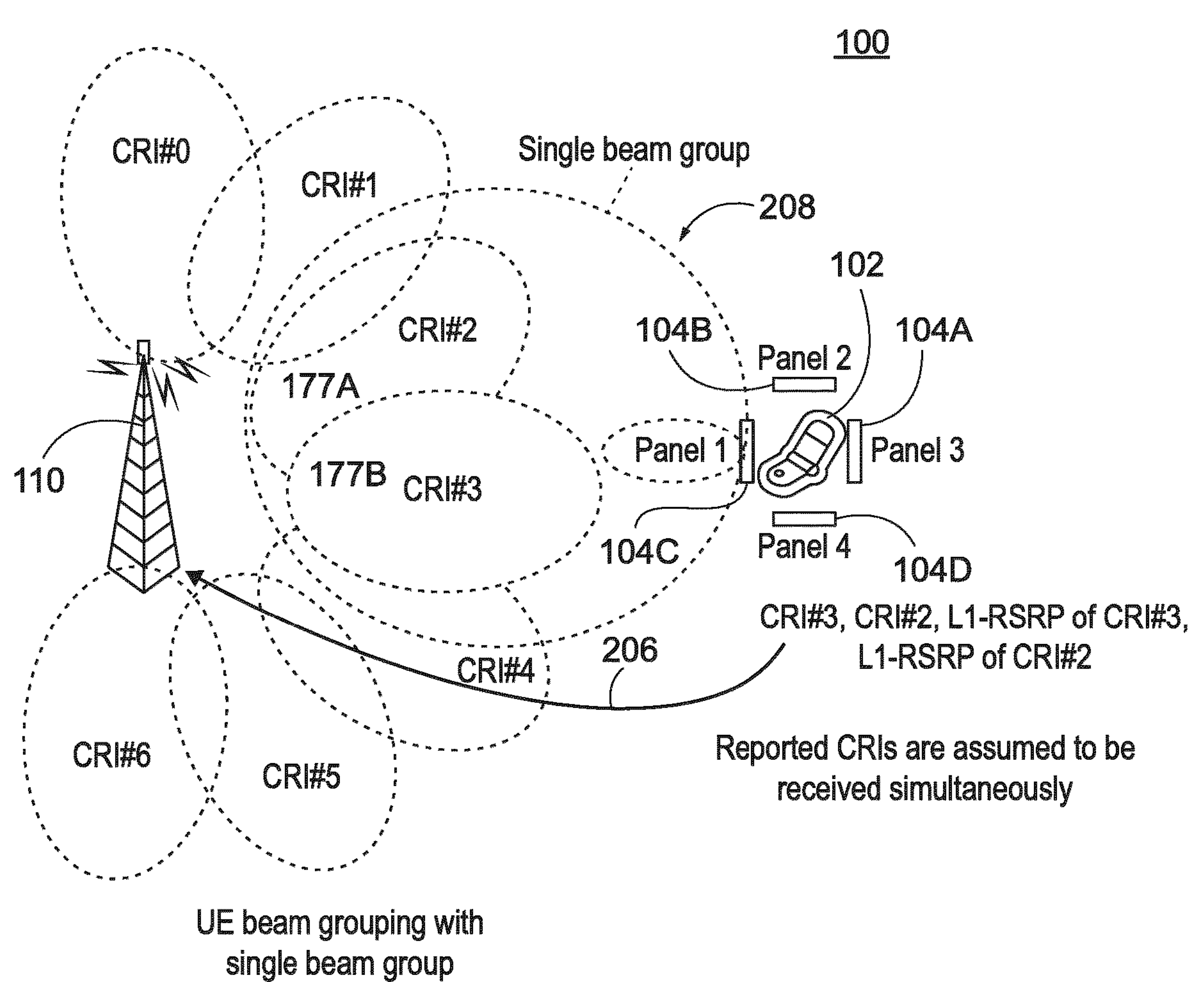
FIG. 2 depicts the system of FIG. 1 including beam group based reporting, in accordance with some example embodiments.

To enhance scheduling and downlink transmit beam switching flexibility, the beam group based reporting may be used as shown at FIG. 2. FIG. 2 depicts system 100 but operating using beam group based reporting at 206 with NZP-CSI-RS resources with single user equipment beam group 208. When beam group reporting is configured, the user equipment 102 may simultaneously receive up to 2 CRIs for example, with single or multiple spatial receive filters. As 3GPP TS 38.214 Release 15 may not clearly define whether a single or multiple receive spatial filters have been used, there may be some ambiguity for the network such as the base station 110 (without reporting from the UE 102) regarding whether reported CRIs can be used for multi-beam transmission with spatial multiplexing. In the example of FIG. 2, the user equipment uses a single spatial filter. Since multiple CRIs can be received with the single spatial filter at the user equipment 102, no extra time is needed when downlink transmit beam change occurs within the beam group 208. As such, the network/base station's scheduling restrictions may be reduced.

Regarding the channel state information (CSI) report setting for beam management, non-differential based reporting and differential based reporting for the group-based beam reporting and the non-group beam reporting may be supported in the specifications, such as TS 38.214. And, the reporting format may be reused between the group-based beam reporting and the non-group beam reporting schemes. In the case of differential reporting, it reduces CSI reporting overhead by using differential encoding. When the number of reported CRIs is larger than one for example, differential reporting may be used. For example, a 7 bit-length field may be reserved to indicate quantized measured L1-RSRP between the largest and smallest L1-RSRP value (e.g., −140 dBm to −44 dBm), but a 4 bit-length fields may be reserved to indicate a differentially coded L1-RSRP value with respect to the maximum value with 2-bit step-size. Furthermore, the network, such as base station 110, may configure up to 4 CRIs or 4 Synchronization Signal Block resource indicators (SSB-RIs) associated with L1-RSRP values to be reported.

In the case of beam group reporting, there may be a variety of schemes to implement "beam group" reporting. For example, the user equipment may report different N sets (e.g., groups or pairs), and in each group, M different beams within the group (or pair) may be simultaneously received by the user equipment. As used herein, the term "group" may refer to at least a "pair" if not more. FIG. 2 depicts 2 beams 177A and 177B in the beam group 208. When the user equipment simultaneously receives (via multiple antenna panels) different channel measurement resources (CMRs) associated with different transmit-receive points (TRPs), the user equipment may identify which channel measurement resources (CMRs) can be received simultaneously. In other words, the user equipment may need to identify how many antenna panels (and/or which antenna panels) can be used for the simultaneous reception of the CMR with sufficient received signal quality.

The user equipment's reception capability may dictate how many antenna panels can be used for the simultaneous reception. In practice, it may be likely that not all of the user equipment's receive antenna panels can be used for simultaneous reception. As such, the user equipment may need to scan through some, if not all, of the possible combinations of antenna panels and receive beams for simultaneous reception purposes. For example, if the user equipment is equipped with four antenna panels but only two out of the four panels can be used (based on channel state measurements, such as RSRP, SINR, etc.) for simultaneous reception at a given time, the user equipment may perform an exhaustive search and measurement throughout six different antenna panel combinations, which would include the following: panel#1-panel#2, panel#1-panel#3, panel#1-panel#4, panel#2-panel#3, panel#2-panel#4, and panel#3-panel#4). This search process clearly increases processing latency, computational complexity, and power consumption at the user equipment. After the user equipment identifies the best combination for the simultaneous reception of the channel measurement resources (CMR) with multiple antenna panels and receive beams, the user equipment may report to the network the M different identified simultaneously received channel measurement resources per pair (or group) f.

Figure 3:
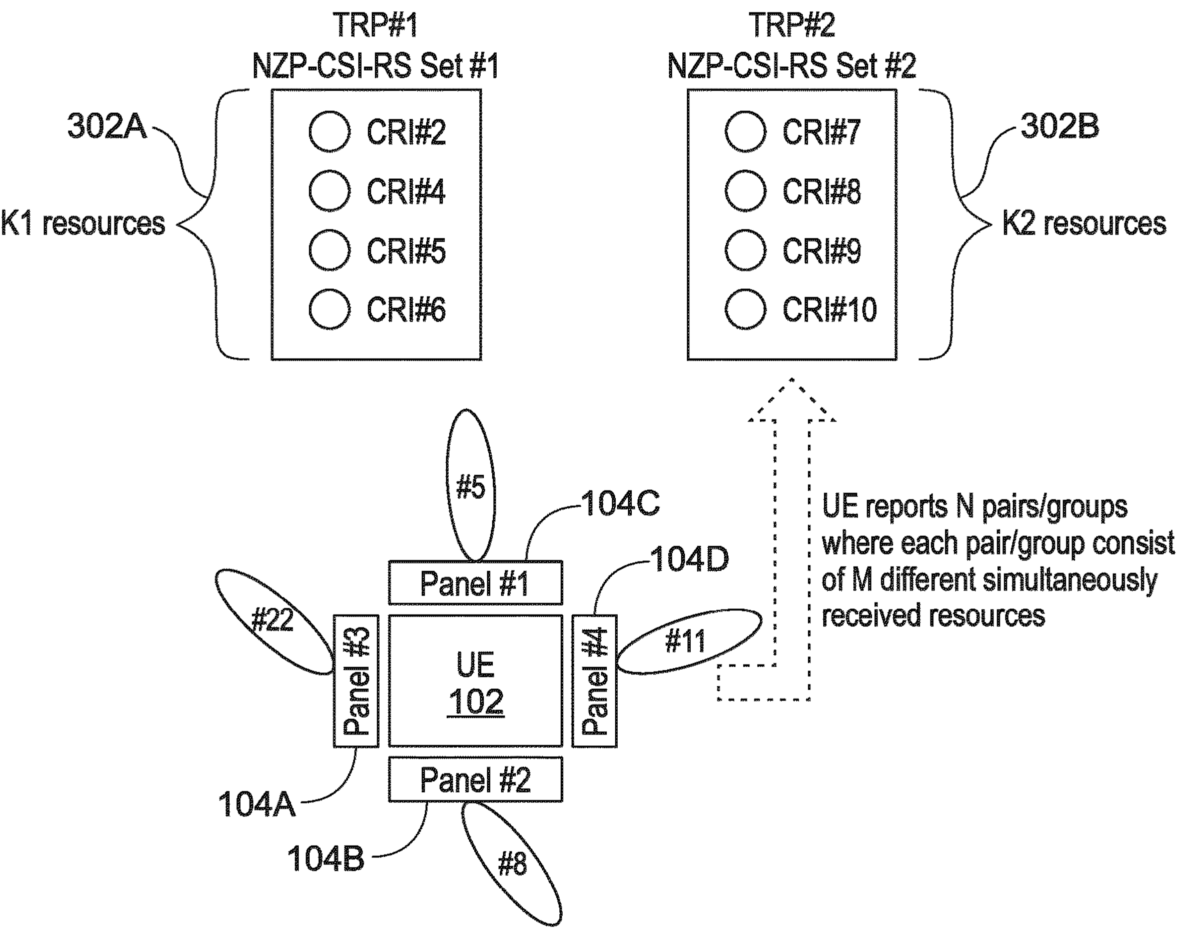
FIG. 3 depicts an example of beam management measurement resource configurations including two separate resource sets, in accordance with some example embodiments.

There are different alternatives for beam management measurement resource configurations associated with channel state information reporting (see, e.g., RAN1-104e meeting). FIG. 3 depicts the user equipment 102 including antennal panels 104A-D, in accordance with some example embodiments. FIG. 3 also depicts an example of beam management (BM) measurement resource configurations including two separate resource sets K1 302A and K2 302B. Each of the resource sets includes a corresponding amount of resources (e.g., resources identified by CRI#2, CRI#4, etc.) associated with TRPs and CSI reporting to the network. In the example of FIG. 3, the user equipment may be configured (or be capable of) simultaneously receiving the channel measurement resources (CMRs) with all, or some, of the receive antenna panels 104A-D. Moreover, the user equipment may perform beam management (BM) measurements from the two different NZP-CSI-RS resources sets 302A-B, each of which is used as channel measurement resources (CMRs) that can be received simultaneously at the UE. It is assumed that the CMRs associated with the same NZP-CSI-RS resource set (or any other type of resource set such as SSB) cannot be received simultaneously. The CMRs (e.g. NZP-CSI-RS resources) can be configured as periodic, semi-persistent, or aperiodic resources. Based on the measurement(s) performed at the user equipment 102, the user equipment 102 may report N different sets (e.g., pairs or groups, where in each pair/group, M different CMRs can be received simultaneously.

In an alternative beam management approach, spatial relationships (e.g., quasi-co-location-type D, QCL-typeD) of different resources may be used as well. When the spatial relationships are used, SSB resources are associated with different TRPs, and the channel measurement resources (CMRs)/resource sets (e.g., NZP-CSI-RS) having QCL-typeD associations are configured with the SSB resources. As such, the different resources transmitted from different TRPs can be identified and resources from different TRPs can be reported. In this spatial relationship approach, the user equipment may be configured to receive simultaneously different CMRs within different CMRs sets, but the CMRs in the same channel measurement resource set cannot be received simultaneously.

Figure 4:
FIG. 4 depicts spatial relationships for beam management, in accordance with some example embodiments.

FIG. 4 depicts the spatial relationships, such as QCL-typeD, between SSB and NZP-CSI-RS resources for beam management, in accordance with some example embodiments. The starting point of an arrow (e.g., 410 at FIG. 4) defines a resource to be a spatial source for the target resource associated at the end of the arrow (e.g., 412 at FIG. 4). For example, the NZP-CSI-RS based periodic time-frequency tracking reference signal (e.g., P-TRS) can work as a spatial source for aperiodic TRS (A-TRS) or another NZP-CSI-RS without repetition (e.g., for beam management (BM) procedures P1, P2 as well as CSI-acquisition) or NZP-CSI-RS with repetition (BM P3). Similarly, the SSB resource can be configured as spatial source for the target P-TRS or CSI-RS with and without repetition.

Figure 5:
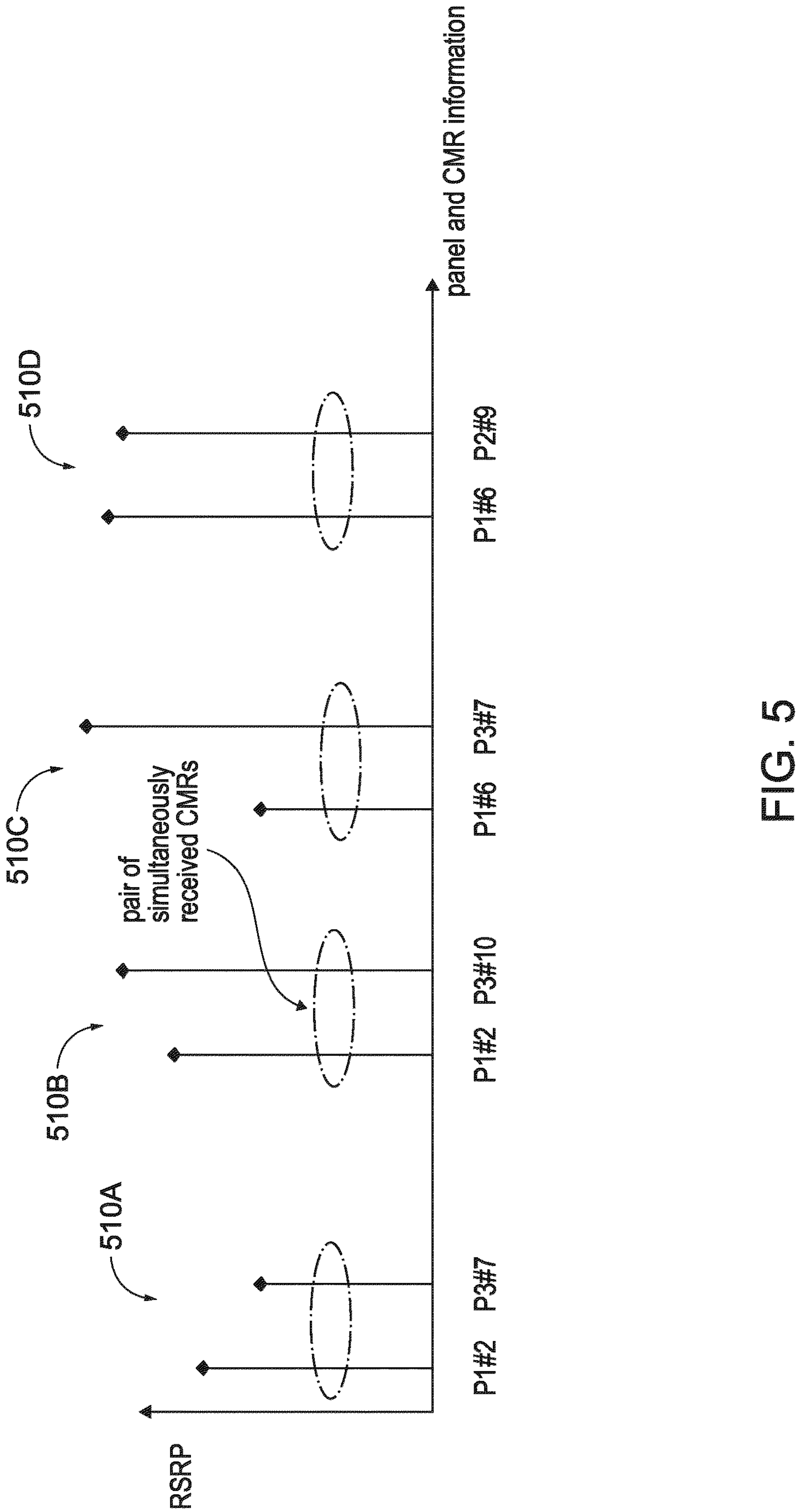
FIGS. 5 and 6 depict examples of multiple, simultaneously received channel measurement resource (CMR) groups associated with different receive (RX) antenna panels, in accordance with some example embodiments.

FIG. 5 depicts an example of multiple, simultaneously received candidate channel measurement resource (CMR) sets 510A-D (which in this example the set is a group/pair, so M=2 although the group may be larger than a pair as well) associated with different receive (RX) antenna panels. In the example of FIG. 5, the user equipment may determine, based on the L1-RSRP, different simultaneously received downlink transmit (TX) beam sets, such as pair combinations associated with CMRs. To illustrate further by way of an example, the user equipment may simultaneously receive channel resource indices 2 and 10 with receive (RX) antenna panels 1 and 3, respectively as shown at FIG. 5 at 510B (wherein P1#2 refers to the RX antenna panel 1 and #2 refers to the receive channel measurement resource index 2, for example). After the user equipment computes the possible simultaneously received channel measurement resource pairs based on the corresponding measured L1-RSRP or L1-SINR values, the user equipment has an understanding of which of the channel measurement resource pairs and the L1-RSRP or L1-SINR values for reporting to the network.

When the user equipment is configured with L1-RSRP reporting for example, the user equipment may determine the simultaneously received CMRs for each pair by ordering (per receive antenna panel or per group of receive antenna panels) received CMRs in ascending order in terms of L1-RSRP. After this, the user equipment may then select for reporting the strongest channel measurement resource(s) for each pair, such that selected resources defining the pair (or group) are not associated with the same CMR set (e.g. NZP-CSI-RS or SSB).

Figure 6:
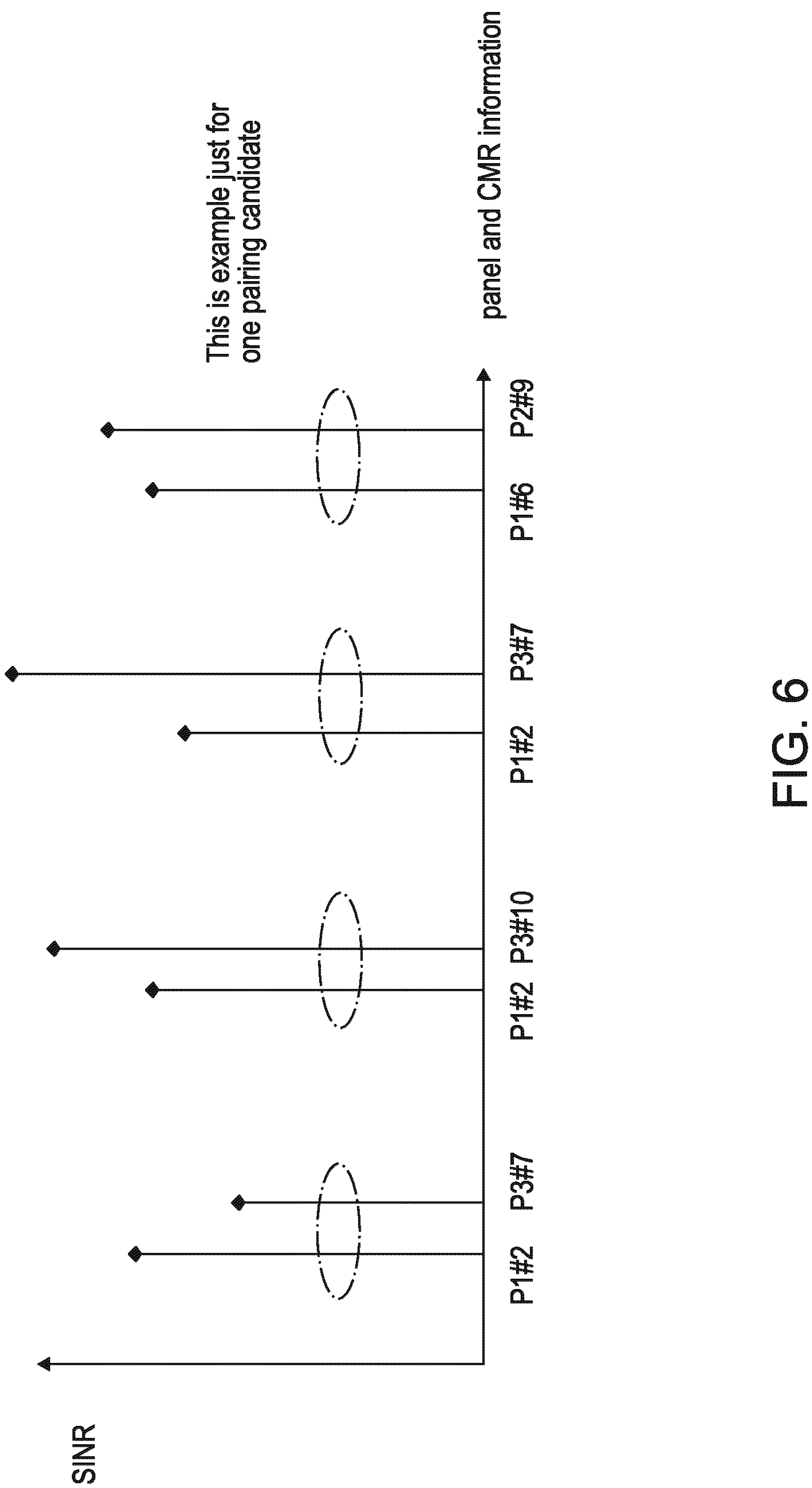

When the user equipment is configured with L1-SINR reporting for example, the user equipment may compute L1-SINR for each resource within the resource pair. For example, the UE may compute an SINR hypothesis for each resource within the pair by assuming another simultaneously received CMRs acting as an interference resource. Alternatively, or additionally, the network (e.g., gNB) may explicitly configures separate interference resource(s) used in the SINR hypothesis computation. The number of possible resource combinations can be very large, which may result in computational complexity and latency increases. Furthermore, the user equipment may assume that the interference resource is a spatially co-location-typed (e.g., QCL type) with intended channel measurement resource. Since in each pair of channel measurement resources another simultaneously received channel measurement resource may be used as an interference resource, it is possible to have a large variation in between (in terms of L1-SINR) resources, such as P1#2 and P3#10 as shown FIG. 6. Due to potential interference coupling of simultaneously received resources, it is not as straightforward as with the L1-RSRP case to determine the N-best reported resource pairs to be reported in terms of L1-SINR. Without defining any ranking method for resource pairs/groups with L1-SINR for the reported CMRs pairs, it is likely that the reported N channel measurement resource pairs may result into scheduling restrictions at the network, such as the base station or TRP. This may be circumvented by reporting all possible resource pairs/groups, but results in all candidate pairs being reported, which may lead to a significant reporting signaling overhead. By configuring two different NZP-CSI-RS resource sets as channel measurement resources with 64 resources in each resource set (e.g., in the case of a 3GPP Release 16 UE capability) for example, the total number of reported combinations is equal to 4096 different SINR values.

In some example embodiments, there is provided triggering of "beam group" reporting, which may be in the form of assistance information to the network. The reporting may be trigger by the network side and/or by the user equipment in the form of user equipment-side event based triggering). In some example embodiments, the beam group assistance triggering may enable a more dynamic operation of beam grouping in presence of multiple TRPs by facilitating a more dynamic adaptation of the parametrization of beam group reporting. Furthermore, the assistance information for beam group reporting procedure may enable enhanced scheduling flexibility of the network (e.g. enabling awareness of interferers) and/or reduced reporting signaling overhead. In some example embodiments, there is provided an enhanced beam group reporting procedure for multiple transmission and reception point (TRP) scenarios.

In some example embodiment, there may be provided, as noted, network based triggering for the reporting of information for beam grouping on measurements on set(s) of channel measurement resources. This reporting may be in the form of assistance information for beam grouping. In some example embodiments, the network, such as a gNB type base station and/or other type of base station, may trigger the UE to report assistance information to the network via physical layer signaling and/or multiple access channel (MAC) and/or radio resource control (RRC) level signaling. After this, the UE provides assistance information report by using uplink resources (e.g., aperiodic or semi-persistent physical uplink control channel/physical uplink shared channel resources).

In some example embodiments, the network may trigger the UE to report assistance information (for configuring beam group reporting) including a differentially encoded L-largest absolute beam group difference values that correspond to the difference between maximum and minimum values of SINR (e.g., in the case of L1-SINR or SS-SINR, synchronization signal signal-to-interference-plus-noise ratio) and/or maximum and minimum values of RSRP (e.g., in the case of L1-RSRP) for simultaneously received resource pair/group, where differential encoding is performed with Q1-quantization levels and L1-bits, configured by the network, associated with configured beam group assistance measurement window.

In some example embodiments, the network may trigger the UE to report information for beam group reporting (which may include the total number of beam groups/pairs) based on beam and/or interference measurements on downlink reference signal resources (e.g. NZP-CSI-RS, CSI-IM, IMR, etc.) or signal resources (e.g. SSB) within a window, such as channel management resource measurement window, assistance measurement window, and/or the like. For example, based on beam measurements during the assistance measurement window for beam group reporting, the UE can determine how many different beam group/pairs can be determined or selected for reporting back to the network. The determined number of beam groups/pairs is assumed to vary, for example, according to deployment scenario and/or mobility conditions and/or orientation of the UE and/or rotation of the UE, etc.

In some example embodiments, the network may trigger the UE to report (e.g., as assistance information) the number of simultaneously received CMRs for each group/pair (which may be common for all groups or may be group-specific). The number of simultaneously received CMRs is assumed to vary, for example, according to deployment scenario and/or mobility conditions and/or orientation of the UE and/or rotation of the UE, etc.

In some example embodiments, the network may trigger the UE to report (e.g., as assistance information) the I-largest/dominant interferers in terms of measured interference powers (which may be differentially encoded) with Q2-quantization levels and L2-bits associated with resource identifiers (IDs) associated with interference resources with I-largest/dominant interferers in terms of measured interference powers. The network may configure the spatial source of interference resource to be in any downlink resource/signal. In other words, depending on the configuration of spatial source (e.g., quasi-colocation (QCL type-D) info) for the interference resource, the UE may assume that the measured interference resource is either spatially quasi-colocated (QCL):ed with channel measurement resource or not. This way the network can obtain further assistance information about interference powers measured from same or different spatial direction as channel measurement resource. The configured interference resources can be for example, NZP-CSI-RS resources and/or channel state information interference measurement (CSI-IM) resources (IMR) and/or any other DL reference signal (e.g. NZP-CSI-RS for CSI-acquisition, fine frequency and time-tracking, mobility or positioning, phase-tracking reference signal (PTRS), demodulation reference signal (DMRS)) or DL signal (e.g. SSB). These resources can be associated with serving or neighboring cells.

In some example embodiments, the network may configure a window (e.g., measurement window, assistance measurement window, or the like) for one or more measurements (and/or one or more computations) for the reporting of information regarding the beam groupings. The measurement window represents a time window (e.g., a time period, quantity of slots, measurement timing configuration for measurement, etc.) within which the measurements and/or computations for beam group reporting are to be performed by the UE. The measurement window for beam group reporting may be configured by higher layers in the network and/or may be configured in time as aperiodic, semi-persistent, or periodic. The time span of measurement window for beam group reporting may be defined in terms of symbols or slots with respect to a start time of the window in terms of symbols or slots. The target of assistance measurement window is to define a specific time window that enables the UE to perform measurements, computations, and/or related reporting within the time provided by the window. Based on the reported information (e.g., measurements on the set(s) of channel measurement resources of the beam groups), the network may re-configure semi-statistically configured beam group reporting parameters.

In some example embodiments, the beam group measurement may be performed or associated with a variety of types of channel resources, examples of which include: Synchronization Signal Block (SSB) resources; NZP-CSI-RS resources (BM, CSI acquisition, time-frequency tracking, interference); demodulation reference signal (DMRS) resources of data/control; phase-tracking RS (PTRS) resources; CSI-RS mobility resources (e.g., for mobility measurements); DL positioning reference signal (PRS) resources (for positioning); and/or channel state information interference measurements (CSI-IM) and/or IMR resources (e.g., for interference measurement).

In some example embodiments, the triggering of reporting by the UE may be implemented via layer 1 (L1) signaling or via media access control/radio resource control layer signaling (e.g., with L1 via existing or new user-specific or group common DCI format as part of a physical downlink control channel or with MAC having a dedicated MAC CE).

In some example embodiments, there may be provided user equipment event based triggering for the reporting of information for beam grouping on measurements on set(s) of channel measurement resources. As noted, this reporting may be in the form of assistance information to the network.

In some example embodiments, at least one trigger condition (examples of which are described below) may be associated with CMRs within a beam group measurement window. In some example embodiments, the UE is preconfigured (and/or provided) with at least one triggering condition.

In some example embodiments, the at least one triggering condition may be as follows: (condition 1) when the measured linear average SINR (or RSRP) of resources associated with a beam group's measurement window is smaller than a preconfigured SINR threshold value (or RSRP threshold value), the UE requests a DL transmit (TX) power boost for the configured channel measurement resources by reporting (e.g., as assistance information) a quantized power increase value. For example, the UE may trigger he DL TX power boost request, when the value of $P_{delta}$ is negative, otherwise no DL TX boost is requested, which is summarized mathematically as follows:

```
P_delta = averageMeasuredValue − configThreshold,
if (P_delta < 0)
   DL TX power boost request is transmitted
otherwise
   no DL TX power boost request is transmitted
end,
```

wherein the averageMeasuredValue may be determined by computing a linear average over computed SINR (or RSRP) values, and the configThreshold (which an SINR value or RSRP value) is configured by the network. The requested DL TX power boost value may be an absolute value of $P_{delta}$, which may be defined as, for example, the closest value between preconfigured quantized power boost values with Q3 different quantization levels.

In some example embodiments, the at least one trigger condition may be as follows: (condition 2) when the measured linear average value of absolute beam group difference value (as noted above) of measurement resources within the beam group assistance window is larger compared with the preconfigured maximum allowable dynamic range, the UE requests an enlargement of the maximum allowable dynamic range by reporting (e.g., as assistance information) quantized dynamic range increase value. For example, the UE triggers dynamic range increase, when the value of $D_{delta}$ is negative, otherwise no, which is mathematically summarized as follows:

```
D_delta = averageMeasuredDifferenceValue − configMaxAllowedRange.
if (D_delta < 0)
   dynamic range increase request is transmitted
otherwise
   no dynamic range increase request is transmitted
end,
```

wherein the averageMeasuredDifferenceValue may be determined by computing a linear average over different between maximum and minimum values of SINR (or RSRP) values associated with resources within pair/group, and configMaxAllowedRange (which may be in terms of SINR or RSRP) is configured by the network. For example, the requested dynamic range increase may be an absolute value of $D_{delta}$, which may be defined as the closest value between preconfigured dynamic range increase values with Q3 different quantization levels.

In some example embodiments, the at least one trigger condition may be as follows: (condition 3) when the measured linear average power value of interference measurement resource (as noted above) within the beam group assistance window is larger compared with the preconfigured interference power threshold, the user equipment reports (e.g., as assistance information) resource indices associated with (or identifying) the measured linear average power value being above preconfigured interference threshold.

In some example embodiments, if UL resources have not been configured for the beam grouping assistance report, the UE requests UL resources for the beam grouping assistance report.

In some example embodiments, there is provided a resource grouping (or, e.g., a pairing) procedure for simultaneously received CMRs based (e.g., SINR, RSRP, etc.) beam reporting. In some example embodiments, the user equipment may determine the resource grouping of the simultaneously received CMRs. The network may configure CMRs associated with measurements, such as beam grouping measurements, into one or more CMR set(s). The UE may assume that there is information available (which may be explicit or implicit) regarding how different CMRs are associated among TRPs and/or gNBs. For beam grouping with multi-TRP operation for example, the UE may assume that simultaneously received resources within a group (or pair) need to be associated with different TRPs. For example, the UE may select which groups (e.g., which sets of candidate channel measurement resources) should be reported (e.g., as assistance information) to the network. In some example embodiments, the UE may select and/or rank, based on at least one rule (e.g., a criterion), which group(s) (e.g., pair(s)) of simultaneously received channel measurement resources should be reported (e.g., as assistance information for the beam group reporting or assistance information for scheduling of DL/UL beams) to the network.

In some example embodiments, the beam group selection or ranking "rule" is as follows: (rule 1) for each candidate channel measurement resource set (or pair), the user equipment compares whether the computed beam group difference value, $d_k$, is within the preconfigured maximum allowable dynamic range, $D_{max}$ (i.e. $d_k \leq D_{max}$). The beam group difference value is defined as absolute value (e.g., abs( )) of the difference between maximum and minimum SINR values of the simultaneously received resources within a pair/group, e.g., for resource pair/group k, $d_k = abs(abs(max(SINR_{i=1}, SINR_{i=2})) - abs(min(SINR_{i=1}, SINR_{i=2})))$.

In some example embodiments, the beam group selection or ranking "rule" is as follows: (rule 2) the user equipment compares whether the computed SINR values within the candidate channel measurement resource set(s) are above a configured SINR-threshold value.

In some example embodiments, the beam group selection or ranking "rule" is as follows: (rule 3) the UE ranks candidate sets of simultaneously received channel measurement resources according to one of the following criteria/reporting rule:

in descending or ascending order of the absolute beam group difference values associated with the group which satisfy rules 2-3 noted above (e.g., 4 groups/pairs in descending order $d_3>d_4>d_1>d_2$); or in descending or ascending order of aggregated mutual information (MI) over different resources associated with SINRs within each resource group/pair (with four pairs/groups and three resources within each group/pair, $$MI_k = \sum_{i=1}^{3} \log 2(1 + SINR_i),$$

ordered in descending order $MI_2>MI_1>MI_4>MI_3$).

In some example embodiments, the beam group selection or ranking "rule" is as follows: (rule 4) by using the ranked candidate sets/groups (e.g., based on reporting rule 3), the UE is allowed to select only the set of candidate resource pairs/groups where the number of needed receive (RX) antenna panel switches is minimized to be less or equal to the configured maximum number of antenna panel switching per CSI reporting instance or multiple of CSI reporting instances. Alternatively, the network may configure antenna panel switching latency constraint in time associated with RX antenna panel switching to allow UE the select any combination of receive (RX) antenna panels and RX beams for CMR simultaneous reception such that they meet the configured latency constraint in time units. Alternatively, or additionally, the ranking rule can be a combination of above the ones.

In some example embodiments, the beam group selection or ranking "rule" is as follows: (rule 5) by using the ranked candidate groups (e.g., based on rule 3), the UE may select the best N resource groups/pairs based on rules 1-4 to be reported in one or more CSI-reporting instance.

In some example embodiments, a fallback resource grouping/pairing procedure with L1-SINR for simultaneously received CMR resources is provided. When any of the resource pairs/groups do not satisfy any of rules 1 through 5, the user equipment may fall back to a single gNB or transmission reception point (TRP) mode; the user equipment may report the single best CMR (e.g., report either an L1-RSRP value for the best CMR or an SINR value which is calculated assuming the CMR is not paired with any of the other CMR values).

Figure 7:
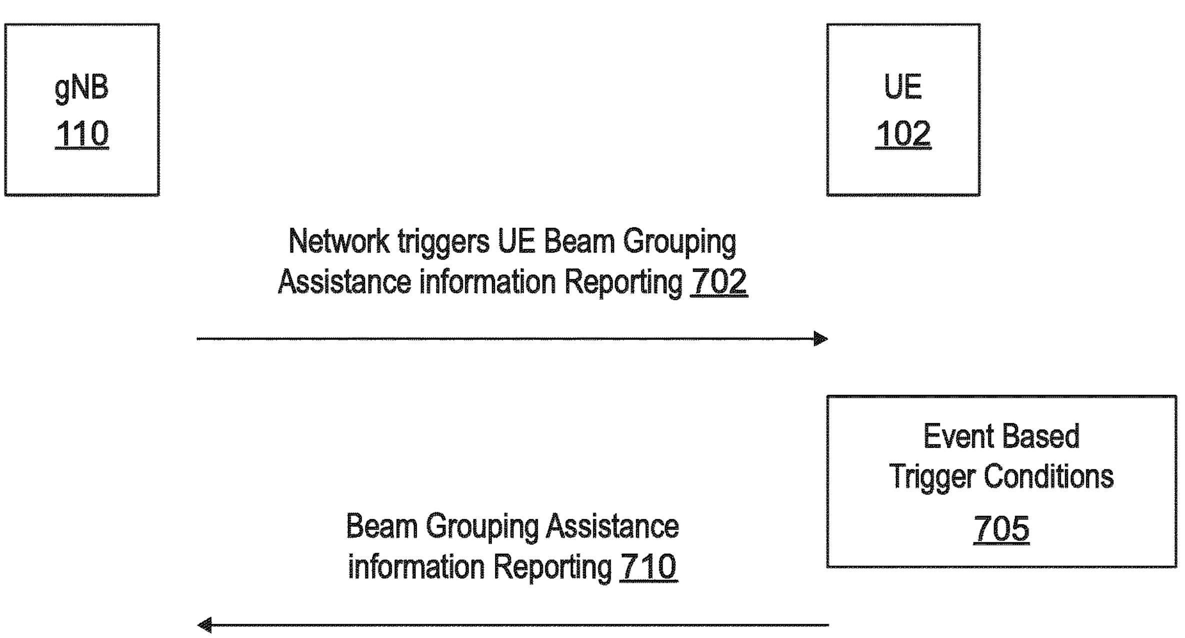
FIG. 7 depicts an example of a flow diagram for triggering beam group assistance information, in accordance with some example embodiments.

FIG. 7 depicts an example of a flow diagram including a base station, such as a gNB base station 110 and a user equipment 102, in accordance with some example embodiments.

At 702, the network, such as gNB 110, may send an indication or message to the user equipment 102 to enable or trigger the UE to provide beam grouping assistance information reporting, in accordance with some example embodiments. Moreover, the gNB may indicate to the user equipment the type of beam grouping assistance information event reporting. For example, the UE may be triggered or enabled to report to the network as assistance information the L-largest absolute beam group difference values associated with a assistance measurement window for beam group reporting, the number of simultaneously received CMRs (CMR) for each group/pair, and/or the I-largest interference powers with interference resource identifiers (IDs) (e.g., an identifier that identifies the channel resource in the UE's cell or a neighboring cell). Moreover, the gNB may configure at the user equipment 102 a measurement window for performing the measurements for assistance information.

The triggering at 702 may be provided via layer 1 (L1) signaling, media access control, or radio resource control (RRC) layer signaling (e.g., with L1 via existing or new user-specific or group common DCI format as part of the physical downlink control channel or with MAC having a dedicated MAC control element).

At 705, the user equipment 102 may include at least one trigger condition associated with the CMRs within an assistance measurement window for beam group reporting. The at least one trigger condition may be predefined (e.g., via standard, such as a 3GPP specification) and/or may be configured, at least in part, by the network. Examples of the trigger conditions are noted above with respect to conditions 1-3 and are summarized at Table 1 below.

TABLE 1

| | |
|---|---|
| Condition 1 | When the measured linear average SINR (or RSRP) of resources associated with a assistance measurement window for beam group reporting is smaller than a preconfigured SINR threshold value (or RSRP threshold value), the UE requests a transmit (TX) power boost for the configured measurement resources. This request may comprise reporting, as assistance information, a quantized power increase value. |
| Condition 2 | When the measured linear average value of absolute difference value of measurement resources within the beam group assistance measurement window is larger compared with the preconfigured maximum allowable dynamic range, the UE requests an increase in the maximum allowable dynamic range. The request may comprise reporting, as assistance information, a quantized dynamic range increase value. |
| Condition 3 | When the measured linear average power value of interference measurement resource within the beam group assistance measurement window is larger compared with the preconfigured interference power threshold, the UE reports, as assistance information, resource indices associated with the measured linear average power value being above preconfigured interference threshold. |

At 710, the user equipment 102 provides the beam grouping assistance information, in accordance with some example embodiments. If condition 1 is triggered, the user equipment includes, as part of the assistance information reporting, a quantized power increase value. If condition 2 is triggered, the assistance information reporting includes quantized dynamic range increase value. And if condition 3 is triggered, the assistance information reporting includes resource indices associated with the measured linear average power value being above preconfigured interference threshold.

In some example embodiments, there may be provided user equipment event based triggering for the beam grouping assistance information reporting. For example, two resource sets, such as two NZP-CSI-RS resource sets, may be configured as the channel measurement resource (CMR) sets with multiple resources in each set. In the example of FIG. 3, the K1-resources 302A in the first set and K2-resources 302B in the second set. Moreover, some of the examples described herein may include a channel state information (CSI) reporting configuration with SINR grouping (e.g., reportQuantity=cri-SINR-grouping, deltaMax=$D_{max}$, and sinrTh=x).

When the user equipment is configured with beam reporting grouping (e.g., cri-SINR-grouping), the user equipment may determine candidate simultaneously received channel measurement resources from different channel measurement resource sets and the channel measurement resource sets corresponding receive (RX) antenna panels according to the user equipment's capability.

Figure 8:
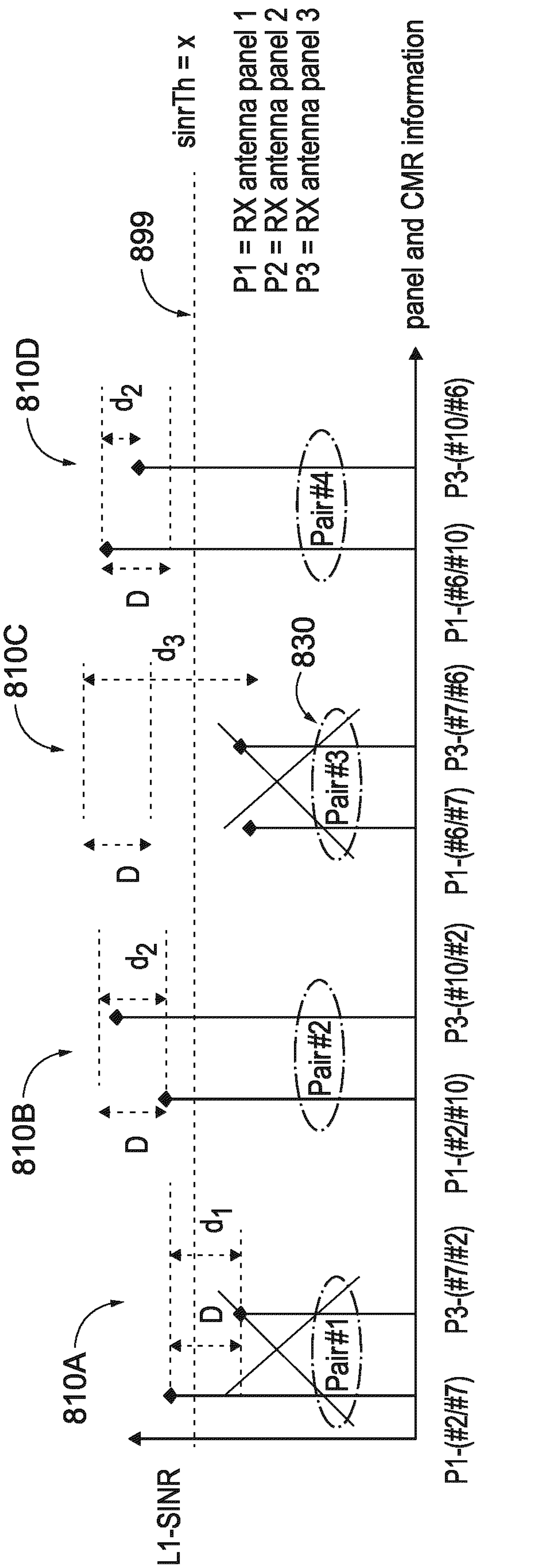
FIG. 8 depicts an example of a resource grouping for different channel measurement resource pairs, in accordance with some example embodiments.

FIG. 8 shows an example of a resource grouping procedure for different candidate channel measurement resources sets 810A-D (which in this example corresponds to pairs of N=2) simultaneously received at UE and to be evaluated for reporting to the network along with, for example, channel state information, such as L1-SINR, RSRP, and/or the like. Based on possible channel measurement resource pairs from two different resource sets (e.g., K1 and K2 as noted above), the user equipment may compute, for example, SINR values for each possible resource pair combinations by using the another channel measurement resource from a different resource set as an interference resource for the SINR computation. As a result, four different candidate resource sets 810A-D are shown at FIG. 8. In the example of FIG. 8, the resource pairs/groups marked with crosses (e.g., Xs at 810A and 810 are sets of CMRs not being qualified, based on one or more rules (e.g., rules 1-5 noted above) for beam group reporting to the network.

Figure 9A:
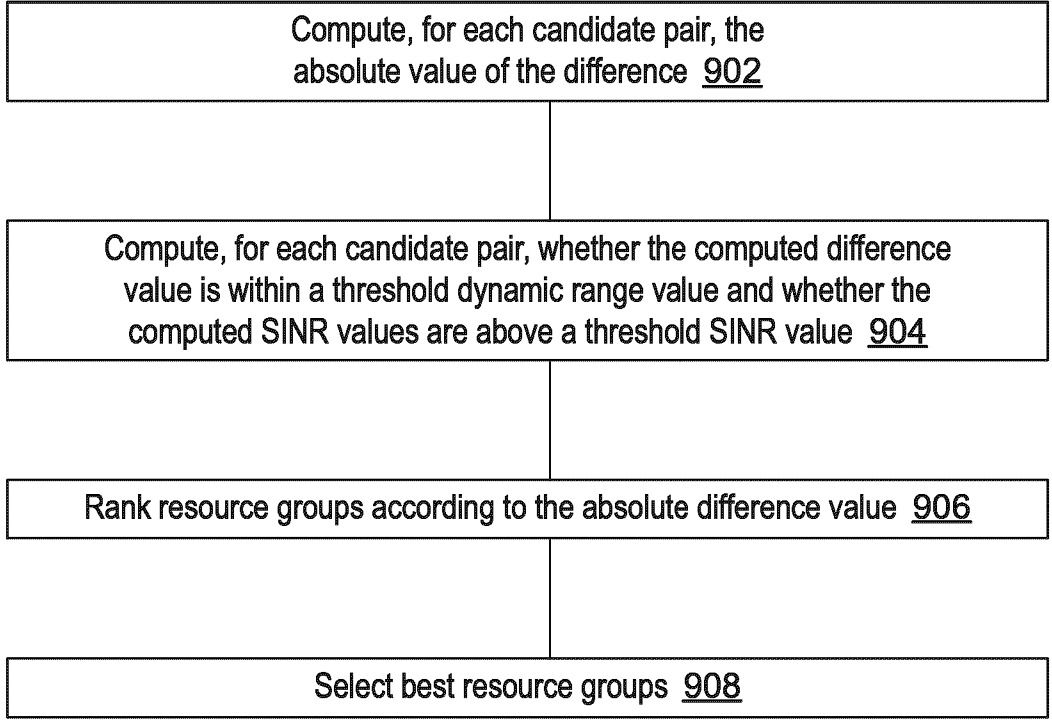
FIG. 9A depicts an example of a process for resource grouping, in accordance with some example embodiments.

To avoid scheduling restrictions for a network and reduce reporting signaling overhead for example, the resource pair ranking criteria/rules (e.g., cri-SINR-grouping, deltaMax, and/or sinrTh parameters) may be configured to define the ranking and reporting for simultaneously resource pairs for the group based reporting. Higher layer configured cri-SINR-grouping parameter may define that the UE perform beam grouping reporting, such that multiple resources can be simultaneously received from different resource sets. Higher layer configured parameter deltaMax may define maximum allowed power difference for a beam group between L1-SINR/RSRP values associated with resources within the pair/group. Higher layer configured parameter sinrTh may define a specific SINR-threshold that used as criterion for reporting. When the user equipment is configured with the ranking criteria/rule (e.g., one or more of rules 1-rule 5 above), the user equipment may perform the process depicted at FIG. 9A.

At 902, the user equipment may compute, for each candidate pair such as Pair #1, Pair #2, etc 810A-DD, the absolute value of the beam group difference, $d_k$, between maximum and minimum values within the pair. For example, for the pair#3 810C (FIG. 8), the user equipment computes the beam group difference as $d_3$.

At 904, the user equipment compares, for each candidate pair, whether the computed beam group difference value from 902 is within a threshold dynamic range value, such as a pre-configured maximum allowed dynamic range, Dmax, so $dk \leq Dmax$. The user equipment may compare whether the computed SINR values within the pair/group are above a threshold SINR value, such as the configured SINRth value=x 899 at FIG. 8.

At 906, the user equipment then ranks groups, such as pair#1, pair#2, etc. 810A-D, according to, for example, another rule such as the absolute beam group difference value. At 908, the user equipment may then selects the N=2 best resource groups for reporting, where the candidate resource pairs/groups satisfy a ranking condition or rule (e.g., in descending/ascending order of absolute beam group difference values associated with the group which satisfy rules 2-3 as noted above). In the example of FIG. 8, the resource pairs/groups marked with crosses 810A and 810C are, as noted, the ones not being qualified for the reporting to the network.

Thus, in the example of FIGS. 8 and 9, the UE's reporting of candidate beam groups/pairs is based on a selection of those beam groups/pairs, which satisfy one or more rules for selection. In this example, the one or more rules result in the selection of pairs 810B and 810D in the beam group report sent to the network, while pairs 810A and 810C are not included in the beam group report. In other words, the UE selects which beam groups/pairs to report back to the network.

In the case of differential encoding of N different resource groups/pairs with L1-SINR for example, a single reference resource is configured as reference point for differential encoding. For example, one SINR value of the resource associated with the strongest (based on above ranking of groups/pairs) resource group acts as a reference value with respect to SINR difference between resources in all N-resource groups/pairs is computed and differential encoding is determined. Alternatively, multiple reference resources are configured as reference points for differential encoding. In each group resource having the strongest SINR value is selected as the reference value with respect to SINR differences and differential encoding is determined within group. For example, if N-groups/pairs are configured, N-different reference resources are selected for differential encoding. Two sub-options are possible. A first suboption is that the SINR of the maximum channel measurement resource in each pair is not differentially encoded. A second suboption is that the SINRs of the maximum channel measurement resources in all but the best pair are differentially encoded; the maximum channel measurement resource of the best pair acts as a reference for the maximum channel measurement resources of the other pairs. The SINR of the maximum channel measurement resource in each pair (other than the best pair) is differentially encoded relative to the maximum CMR of the best pair.

Figure 9B:
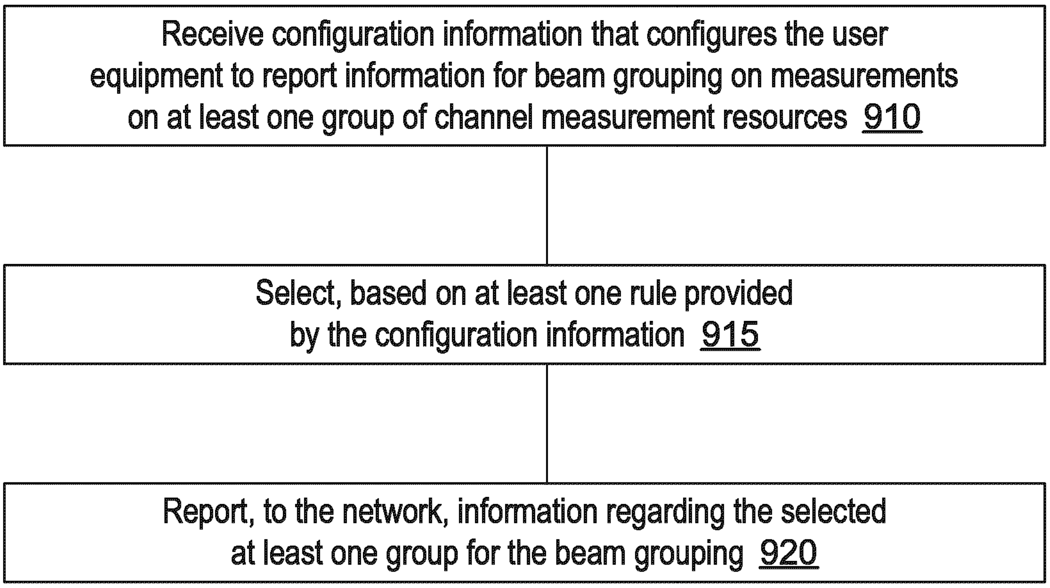
FIG. 9B depicts an example of a process for rule based selection of at least one group of channel measurement resources, in accordance with some example embodiments.

FIG. 9B depicts an example process for rule based selection of the group of CMRs being reported to the network, in accordance with some example embodiments.

At 910, the UE may receive configuration information that configures the user equipment to report information for beam grouping on measurements on at least one group of channel measurement resources, in accordance with some example embodiments. For example, the network (e.g., gNB) may provide to the UE configuration information such as information regarding a measurement window for the plurality of groups channel measurement resources, an identification of the channel measurement resources, one or more conditions for triggering reporting to the network, and/or the at least one rule for selecting the groups.

At 915, the UE may select, based on at least one rule provided by the configuration information, at least one group from a plurality of groups of channel measurement resources, in accordance with some example embodiments. These groups of channel measurement resources may be received simultaneously (e.g., at about the same time such as within a time period for a cyclic prefix) at a plurality of antenna panels at the user equipment.

Referring to FIG. 8, the UE may perform one or more measurement (and/or computations) on the groups of CMRs. In the example of FIG. 8, SINR measurements/computations are performed on: the first group 810A of CMRs, such as at antenna panel 1 (P1), CMR #2 and an interfering signal for the SINR (which is CMR #7) and at antenna panel #3, CMR #7 and an interfering signal for the SINR (which is CMR #2); on the second group 810B of CMRs, such as at antenna panel 1 (P1), CMR #2 and an interfering signal for the SINR (which is CMR #10) and at antenna panel #3, CMR #10 and an interfering signal for the SINR (which is CMR #2); on the third group 810C of CMRs, such as at antenna panel 1 (P1), CMR #6 and an interfering signal for the SINR (which is CMR #7) and at antenna panel #3, CMR #7 and an interfering signal for the SINR (which is CMR #6); and so forth for group 810B. Based on one or more of the rules (e.g., rules 1-5 noted above), the UE may select which groups to report to the network. For example, the UE may select, based on SINR threshold and/or other types of rules, the best N groups (which in this example correspond to 810B and 810D) to report to the network.

At 920, the UE may report, to the network, information regarding the selected at least one group for the beam grouping, in accordance with some example embodiments. Referring to FIG. 8, the UE may report the N-best groups of CMR resources, such as group 810B and 810D, for example (this reporting may include the CSI measurements such as L1-SINR as well). The network may configure the UE with respect to what should be reported (e.g., the quantity of CMR groups, such as N best which in this example is 2, what CSI (if any) should be reported, etc.)

Figure 10A:
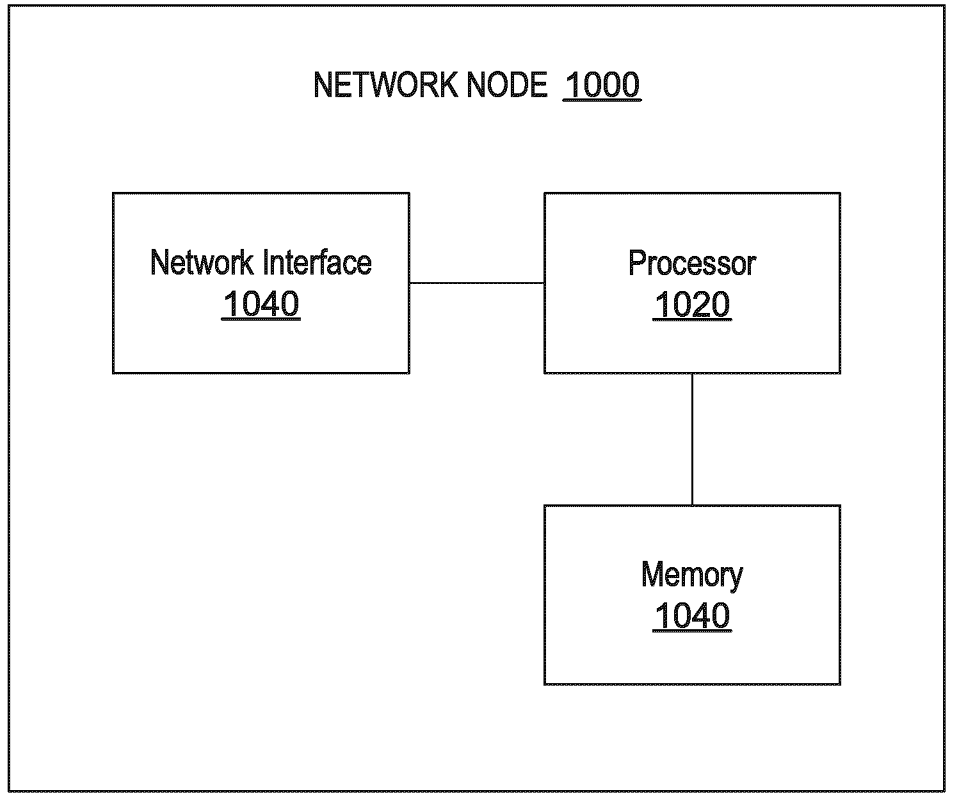
FIG. 10A depicts an example of a network node, in accordance with some example embodiments.

FIG. 10A depicts a block diagram of a network node 1000, in accordance with some example embodiments. The network node 1000 may be configured to provide one or more network side nodes or functions, such as a base station (e.g., gNB, eNB, and/or the like), disclosed herein, such as send, to the user equipment, configuration information to configure the user equipment to report information for beam grouping on measurements on at least one group of channel measurement resources, wherein the configuration information provides at least one rule to enable the user equipment to select the at least one group of channel measurement resources, and receive, from the equipment, information regarding the at least one group selected, by the user equipment, based on the configuration information including the at least one rule.

The network node 1000 may include a network interface 402, a processor 420, and a memory 1004, in accordance with some example embodiments. The network interface 1002 may include wired and/or wireless transceivers to enable access other nodes including base stations, other network nodes, the Internet, other networks, and/or other nodes. The memory 1004 may comprise volatile and/or non-volatile memory including program code, which when executed by at least one processor 1020 provides, among other things, the processes disclosed herein with respect to the network nodes.

Figure 10B:
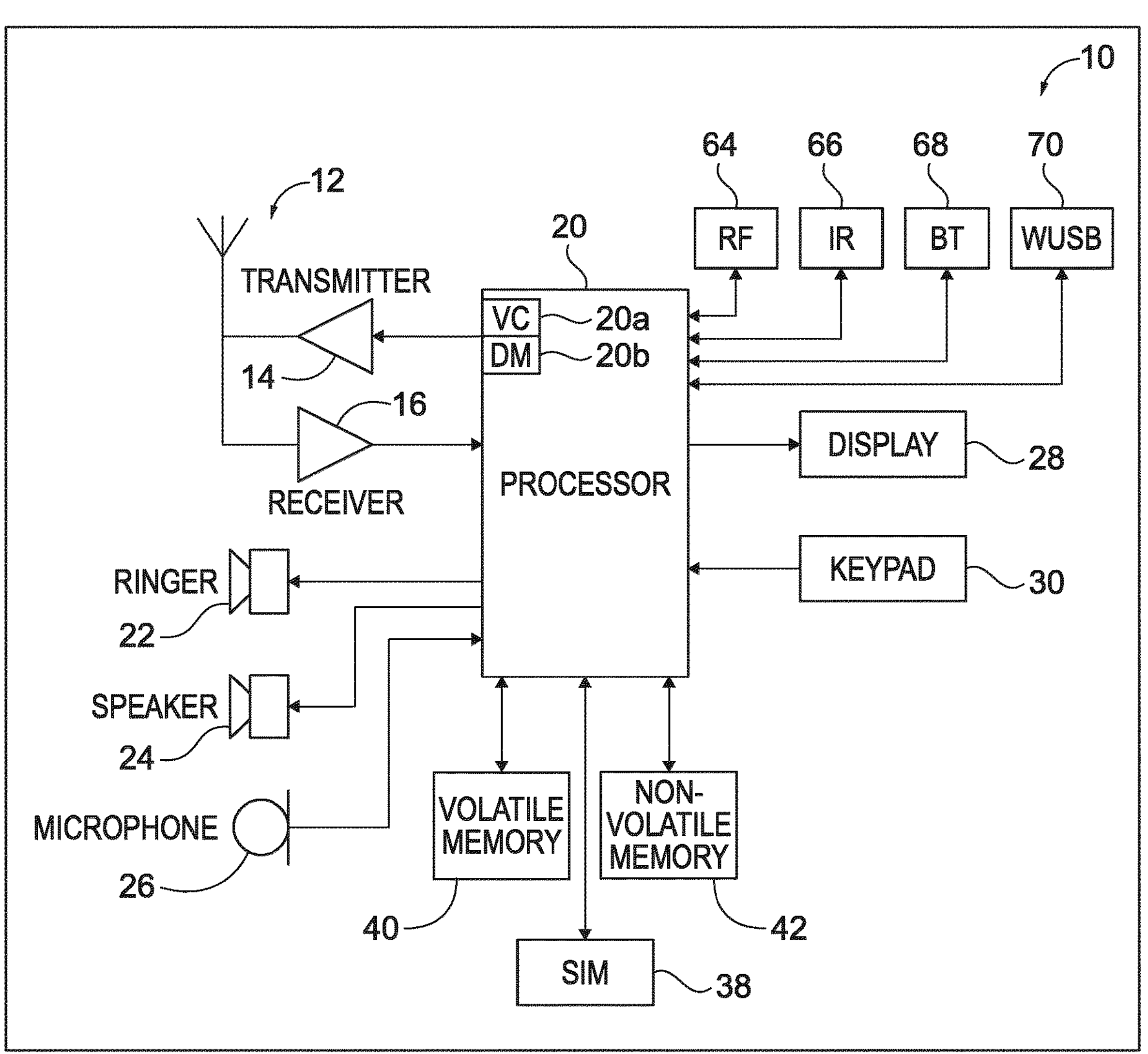
FIG. 10B depicts an example of an apparatus, in accordance with some example embodiments.

FIG. 10B illustrates a block diagram of an apparatus 10, in accordance with some example embodiments. The apparatus 10 may represent a user equipment or other type of similar user side node or element. The user equipment may be configured to receive, at the user equipment, configuration information to configure the user equipment to report information for beam grouping on measurements on at least one group of channel measurement resources; select, by the user equipment, at least one group from a plurality of groups of channel measurement resources, the selecting based on at least one rule provided by the configuration information; and report, to a network, information regarding the selected at least one group for the beam grouping.

The apparatus 10 may include at least one antenna 12 in communication with a transmitter 14 and a receiver 16. Alternatively transmit and receive antennas may be separate. The apparatus 10 may also include a processor 20 configured to provide signals to and receive signals from the transmitter and receiver, respectively, and to control the functioning of the apparatus. Processor 20 may be configured to control the functioning of the transmitter and receiver by effecting control signaling via electrical leads to the transmitter and receiver. Likewise, processor 20 may be configured to control other elements of apparatus 10 by effecting control signaling via electrical leads connecting processor 20 to the other elements, such as a display or a memory. The processor 20 may, for example, be embodied in a variety of ways including circuitry, at least one processing core, one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits (for example, an application specific integrated circuit (ASIC), a field programmable gate array (FPGA), and/or the like), or some combination thereof. Accordingly, although illustrated in FIG. 10B as a single processor, in some example embodiments the processor 20 may comprise a plurality of processors or processing cores.

The apparatus 10 may be capable of operating with one or more air interface standards, communication protocols, modulation types, access types, and/or the like. Signals sent and received by the processor 20 may include signaling information in accordance with an air interface standard of an applicable cellular system, and/or any number of different wireline or wireless networking techniques, comprising but not limited to Wi-Fi, wireless local access network (WLAN) techniques, such as Institute of Electrical and Electronics Engineers (IEEE) 802.11, 802.16, 802.3, ADSL, DOCSIS, and/or the like. In addition, these signals may include speech data, user generated data, user requested data, and/or the like.

For example, the apparatus 10 and/or a cellular modem therein may be capable of operating in accordance with various first generation (1G) communication protocols, second generation (2G or 2.5G) communication protocols, third-generation (3G) communication protocols, fourth-generation (4G) communication protocols, fifth-generation (5G) communication protocols, Internet Protocol Multimedia Subsystem (IMS) communication protocols (for example, session initiation protocol (SIP) and/or the like. For example, the apparatus 10 may be capable of operating in accordance with 2G wireless communication protocols IS-136, Time Division Multiple Access TDMA, Global System for Mobile communications, GSM, IS-95, Code Division Multiple Access, CDMA, and/or the like. In addition, for example, the apparatus 10 may be capable of operating in accordance with 2.5G wireless communication protocols General Packet Radio Service (GPRS), Enhanced Data GSM Environment (EDGE), and/or the like. Further, for example, the apparatus 10 may be capable of operating in accordance with 3G wireless communication protocols, such as Universal Mobile Telecommunications System (UMTS), Code Division Multiple Access 2000 (CDMA2000), Wideband Code Division Multiple Access (WCDMA), Time Division-Synchronous Code Division Multiple Access (TD-SCDMA), and/or the like. The apparatus 10 may be additionally capable of operating in accordance with 3.9G wireless communication protocols, such as Long Term Evolution (LTE), Evolved Universal Terrestrial Radio Access Network (E-UTRAN), and/or the like. Additionally, for example, the apparatus 10 may be capable of operating in accordance with 4G wireless communication protocols, such as LTE Advanced, 5G, and/or the like as well as similar wireless communication protocols that may be subsequently developed.

It is understood that the processor 20 may include circuitry for implementing audio/video and logic functions of apparatus 10. For example, the processor 20 may comprise a digital signal processor device, a microprocessor device, an analog-to-digital converter, a digital-to-analog converter, and/or the like. Control and signal processing functions of the apparatus 10 may be allocated between these devices according to their respective capabilities. The processor 20 may additionally comprise an internal voice coder (VC) 20*a*, an internal data modem (DM) 20*b*, and/or the like. Further, the processor 20 may include functionality to operate one or more software programs, which may be stored in memory. In general, processor 20 and stored software instructions may be configured to cause apparatus 10 to perform actions. For example, processor 20 may be capable of operating a connectivity program, such as a web browser. The connectivity program may allow the apparatus 10 to transmit and receive web content, such as location-based content, according to a protocol, such as wireless application protocol, WAP, hypertext transfer protocol, HTTP, and/or the like.

Apparatus 10 may also comprise a user interface including, for example, an earphone or speaker 24, a ringer 22, a microphone 26, a display 28, a user input interface, and/or the like, which may be operationally coupled to the processor 20. The display 28 may, as noted above, include a touch sensitive display, where a user may touch and/or gesture to make selections, enter values, and/or the like. The processor 20 may also include user interface circuitry configured to control at least some functions of one or more elements of the user interface, such as the speaker 24, the ringer 22, the microphone 26, the display 28, and/or the like. The processor 20 and/or user interface circuitry comprising the processor 20 may be configured to control one or more functions of one or more elements of the user interface through computer program instructions, for example, software and/or firmware, stored on a memory accessible to the processor 20, for example, volatile memory 40, non-volatile memory 42, and/or the like. The apparatus 10 may include a battery for powering various circuits related to the mobile terminal, for example, a circuit to provide mechanical vibration as a detectable output. The user input interface may comprise devices allowing the apparatus 20 to receive data, such as a keypad 30 (which can be a virtual keyboard presented on display 28 or an externally coupled keyboard) and/or other input devices.

As shown in FIG. 10B, apparatus 10 may also include one or more mechanisms for sharing and/or obtaining data. For example, the apparatus 10 may include a short-range radio frequency (RF) transceiver and/or interrogator 64, so data may be shared with and/or obtained from electronic devices in accordance with RF techniques. The apparatus 10 may include other short-range transceivers, such as an infrared (IR) transceiver 66, a Bluetooth™ (BT) transceiver 68 operating using Bluetooth™ wireless technology, a wireless universal serial bus (USB) transceiver 70, a Bluetooth™ Low Energy transceiver, a ZigBee transceiver, an ANT transceiver, a cellular device-to-device transceiver, a wireless local area link transceiver, and/or any other short-range radio technology. Apparatus 10 and, in particular, the short-range transceiver may be capable of transmitting data to and/or receiving data from electronic devices within the proximity of the apparatus, such as within 10 meters, for example. The apparatus 10 including the Wi-Fi or wireless local area networking modem may also be capable of transmitting and/or receiving data from electronic devices according to various wireless networking techniques, including 6LoWpan, Wi-Fi, Wi-Fi low power, WLAN techniques such as IEEE 802.11 techniques, IEEE 802.15 techniques, IEEE 802.16 techniques, and/or the like.

The apparatus 10 may comprise memory, such as a subscriber identity module (SIM) 38, a removable user identity module (R-UIM), an eUICC, an UICC, and/or the like, which may store information elements related to a mobile subscriber. In addition to the SIM, the apparatus 10 may include other removable and/or fixed memory. The apparatus 10 may include volatile memory 40 and/or non-volatile memory 42. For example, volatile memory 40 may include Random Access Memory (RAM) including dynamic and/or static RAM, on-chip or off-chip cache memory, and/or the like. Non-volatile memory 42, which may be embedded and/or removable, may include, for example, read-only memory, flash memory, magnetic storage devices, for example, hard disks, floppy disk drives, magnetic tape, optical disc drives and/or media, non-volatile random access memory (NVRAM), and/or the like. Like volatile memory 40, non-volatile memory 42 may include a cache area for temporary storage of data. At least part of the volatile and/or non-volatile memory may be embedded in processor 20. The memories may store one or more software programs, instructions, pieces of information, data, and/or the like which may be used by the apparatus for performing operations disclosed herein.

The memories may comprise an identifier, such as an international mobile equipment identification (IMEI) code, capable of uniquely identifying apparatus 10. The memories may comprise an identifier, such as an international mobile equipment identification (IMEI) code, capable of uniquely identifying apparatus 10. In the example embodiment, the processor 20 may be configured using computer code stored at memory 40 and/or 42 to the provide operations disclosed herein with respect to the UE (e.g., one or more of the processes, calculations, and the like disclosed herein including the process at FIG. 3).

Some of the embodiments disclosed herein may be implemented in software, hardware, application logic, or a combination of software, hardware, and application logic. The software, application logic, and/or hardware may reside on memory 40, the control apparatus 20, or electronic components, for example. In some example embodiments, the application logic, software or an instruction set is maintained on any one of various conventional computer-readable media. In the context of this document, a "computer-readable storage medium" may be any non-transitory media that can contain, store, communicate, propagate or transport the instructions for use by or in connection with an instruction execution system, apparatus, or device, such as a computer or data processor circuitry; computer-readable medium may comprise a non-transitory computer-readable storage medium that may be any media that can contain or store the instructions for use by or in connection with an instruction execution system, apparatus, or device, such as a computer.

Without in any way limiting the scope, interpretation, or application of the claims appearing below, a technical effect of one or more of the example embodiments disclosed herein may be more dynamic operation of beam grouping in presence of multiple TRPs by facilitating more dynamic adaptation of beam group reporting and/or enhanced scheduling flexibility of the network and reduced reporting signaling overhead.

The subject matter described herein may be embodied in systems, apparatus, methods, and/or articles depending on the desired configuration. For example, the base stations and user equipment (or one or more components therein) and/or the processes described herein can be implemented using one or more of the following: a processor executing program code, an application-specific integrated circuit (ASIC), a digital signal processor (DSP), an embedded processor, a field programmable gate array (FPGA), and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language. As used herein, the term "computer-readable medium" refers to any computer program product, machine-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. Similarly, systems are also described herein that may include a processor and a memory coupled to the processor. The memory may include one or more programs that cause the processor to perform one or more of the operations described herein.

Although a few variations have been described in detail above, other modifications or additions are possible. In particular, further features and/or variations may be provided in addition to those set forth herein. Moreover, the implementations described above may be directed to various combinations and subcombinations of the disclosed features and/or combinations and subcombinations of several further features disclosed above. Other embodiments may be within the scope of the following claims.

If desired, the different functions discussed herein may be performed in a different order and/or concurrently with each other. Furthermore, if desired, one or more of the above-described functions may be optional or may be combined. Although various aspects of some of the embodiments are set out in the independent claims, other aspects of some of the embodiments comprise other combinations of features from the described embodiments and/or the dependent claims with the features of the independent claims, and not solely the combinations explicitly set out in the claims. It is also noted herein that while the above describes example embodiments, these descriptions should not be viewed in a limiting sense. Rather, there are several variations and modifications that may be made without departing from the scope of some of the embodiments as defined in the appended claims. Other embodiments may be within the scope of the following claims. The term "based on" includes "based on at least." The use of the phase "such as" means "such as for example" unless otherwise indicated.

What is claimed:

1. An apparatus comprising:

at least one processor; and at least one memory including computer program code, the at least one memory and the computer program code configured to, with the at least one processor, cause the apparatus to at least:

receive configuration information to configure the apparatus to report information for beam grouping on measurements on at least one group of channel measurement resources (CMRs);

select the at least one group of CMRs from a plurality of groups of CMRs, the selection based on at least one rule provided by the configuration information, wherein the at least one rule comprises ranking the plurality of groups of CMRs in order to determine which of the plurality of groups of CMRs to select as the at least one group of CMRs, and wherein all CMRs of each respective group of CMRs of the plurality of groups of CMRs are received simultaneously; and report, to a network, information regarding the selected at least one group of CMRs for the beam grouping.

2. The apparatus of claim 1, wherein the ranking is based at least in part on one or more of the following:

an absolute beam group difference values of CMRs, an aggregated mutual information of CMRs, a number of needed receive antenna panel switches being minimized to be less or equal to a threshold maximum number of antenna panel switches or less than or equal to a threshold latency constraint value, or a combination thereof.

3. The apparatus of claim 1, wherein the at least rule comprises determining, for the plurality of groups of CMRs, whether a beam group difference value is within a threshold dynamic range value.

4. The apparatus of claim 1, wherein the at least rule comprises determining, for the plurality of groups of CMRs, whether signal-to-interference-plus-noise values for each of the plurality of groups of CMRs are above a signal-to-interference-plus-noise threshold value.

5. The apparatus of claim 1, wherein the information for the beam grouping comprises assistance information for the network.

6. The apparatus of claim 1, wherein the report is triggered by a request from the network.

7. The apparatus of claim 1, wherein the report is triggered by the apparatus based on one or more conditions, and/or wherein the one or more conditions are provided to the apparatus by the network and/or are preconfigured at the apparatus.

8. The apparatus of claim 7, wherein the configuration information includes one or more of the following: information regarding a measurement window for the plurality of groups of CMRs, an identification of CMRs of at least one group of CMRs, the one or more conditions, and the at least one rule.

9. The apparatus of claim 8, wherein the one or more conditions include one or more of the following: a largest absolute beam group difference value associated with the measurement window, a quantity of simultaneously received CMRs for a group of CMRs, and a largest interference power including an interference resource identifier.

10. The apparatus of claim 8, wherein the one or more conditions include a third condition, wherein the third condition comprises a measured linear average power value of interference measurement resource associated with the measurement window being larger than a preconfigured interference power threshold, and wherein in response to the third condition being satisfied, the report for the selected at least one group includes at least one resource index.

11. The apparatus of claim 7, wherein the one or more conditions include a first condition, wherein the first condition comprises a measured linear average signal-to-interference-plus-noise or a measured linear average reference signal received power being smaller than a preconfigured signal-to-interference-plus-noise threshold value or reference signal received power threshold value, and wherein in response to the first condition being satisfied, the report for the selected at least one group of CMRs includes a transmit power boost for CMRs of the selected at least one group of CMRs.

12. The apparatus of claim 7, wherein the one or more conditions include a second condition, wherein the second condition comprises a measured linear average value of an absolute beam group difference, between a maximum and a minimum of signal-to-interference-plus-noise or reference signal received power, being larger than a preconfigured maximum allowable dynamic range, and wherein in response to the second condition being satisfied, the report for the selected at least one group includes a quantized dynamic range increase value.

13. A method comprising:

receiving, at a user equipment (UE), configuration information to configure the UE to report information for beam grouping on measurements on at least one group of channel measurement resources (CMRs);

selecting, by the UE, the at least one group of CMRs from a plurality of groups of CMRs, the selecting based on at least one rule provided by the configuration information, wherein the at least one rule comprises ranking the plurality of groups of CMRs in order to determine which of the plurality of groups of CMRs to select as the at least one group of CMRs, and wherein all CMRs of each respective group of CMRs of the plurality of groups of CMRs are received simultaneously; and reporting, to a network, information regarding the selected at least one group of CMRs for the beam grouping.

14. The method of claim 13, wherein the ranking is based at least in part on one or more of the following:

an absolute beam group difference values of CMRs, an aggregated mutual information of CMRs, a number of needed receive antenna panel switches being minimized to be less or equal to a threshold maximum number of antenna panel switches or less than or equal to a threshold latency constraint value, or a combination thereof.

15. The method of claim 13, wherein the at least rule comprises determining, for the plurality of groups of CMRs, whether a beam group difference value is within a threshold dynamic range value.

16. The method of claim 13, wherein the at least rule comprises determining, for the plurality of groups of CMRs, whether signal-to-interference-plus-noise values for each of the plurality of groups of CMRs are above a signal-to-interference-plus-noise threshold value.

17. The method of claim 13, wherein the information for the beam grouping comprises assistance information for the network.

18. An apparatus comprising:

at least one processor; and at least one memory including computer program code, the at least one memory and the computer program code configured to, with the at least one processor, cause the apparatus to at least:

send, to a user equipment (UE), configuration information to configure the UE to report information for beam grouping on measurements on at least one group of CMRs, wherein the configuration information provides at least one rule to enable the UE to select the at least one group of CMRs, wherein the at least one rule comprises ranking a plurality of groups of CMRs in order to determine which of the plurality of groups of CMRs to select as the at least one group of CMRs, and wherein all CMRs of each respective group of CMRs of the plurality of groups of CMRs are transmitted simultaneously; and receive, from the UE, information regarding the at least one group of CMRs selected, by the UE, based on the configuration information including the at least one rule.

* * * * *